United States Patent

[11] 3,613,629

[72] Inventors William A. Rhyne;
William W. McCrory, Jr.; Ray R. Mallory, all of Panama City, Fla.
[21] Appl. No. 887,570
[22] Filed Dec. 23, 1969
[45] Patented Oct. 19, 1971
[73] Assignee The United States of America as represented by the Secretary of the Navy

[54] BUOYANT CABLE TOWING SYSTEM
7 Claims, 6 Drawing Figs.
[52] U.S. Cl. ..................................................... 114/235 B
[51] Int. Cl. ...................................................... B63b 21/00
[50] Field of Search........................................... 114/235, 235 B, 221; 340/3 T; 174/101.5

[56] References Cited
UNITED STATES PATENTS
| | | | |
|---|---|---|---|
| 2,524,863 | 10/1950 | White............................. | 114/235 B |
| 2,577,077 | 12/1951 | Forsberg....................... | 174/101.5 |
| 3,016,868 | 1/1962 | Haas.............................. | 114/235 B |
| 3,435,410 | 3/1969 | Babb............................. | 174/101.5 UX |

Primary Examiner—Trygve M. Blix
Attorneys—Richard S. Sciascia, Don D. Doty and William T. Skeer ABSTRACT: An improved marine towing system particularly adapted for towing suitable gear along a predetermined course on the surface of shallow water is characterized by a novel diverter-float. The float is of a streamlined shape with an underwater tail surface which stabilizes the float from porpoising and a diverter assembly suspended rigidly beneath the float body by a clamp device secured therebetween.

3,613,629

PATENTED OCT 19 1971    SHEET 1 OF 3

William A. Rhyne
William W. McCrory, Jr.
Ray B. Mallory
INVENTORS

By William K. Shur
Agent

Dex D. Doty
Attorney

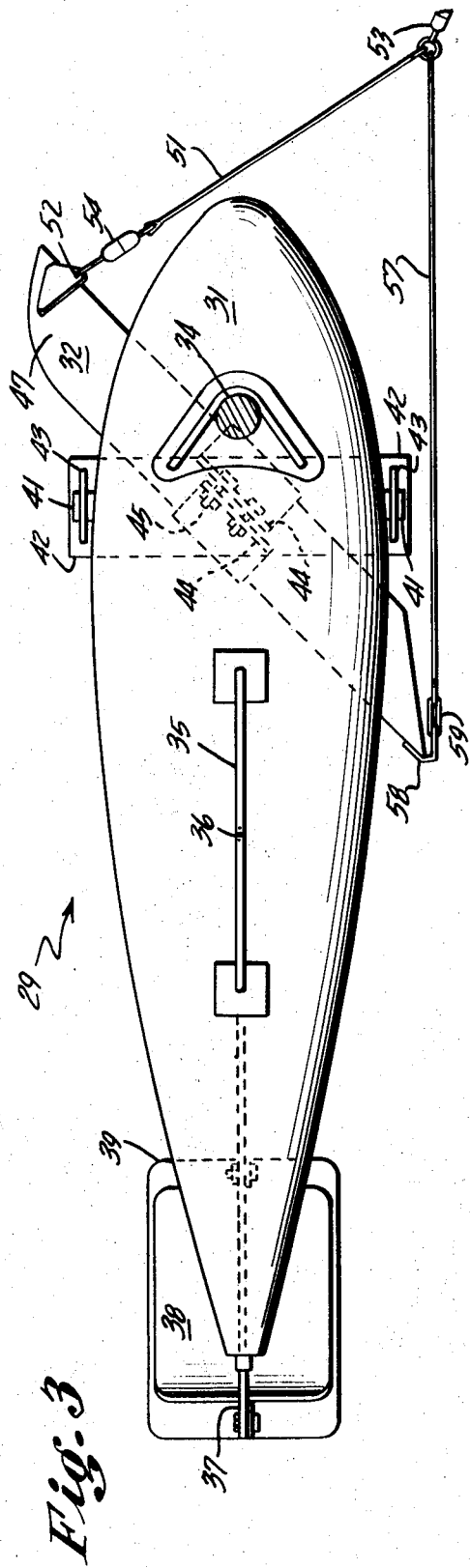
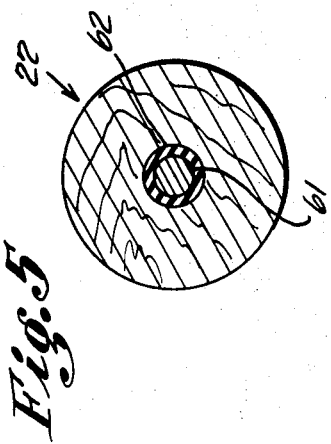
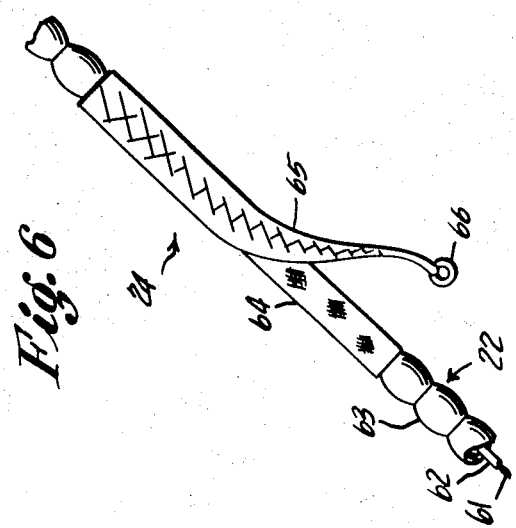

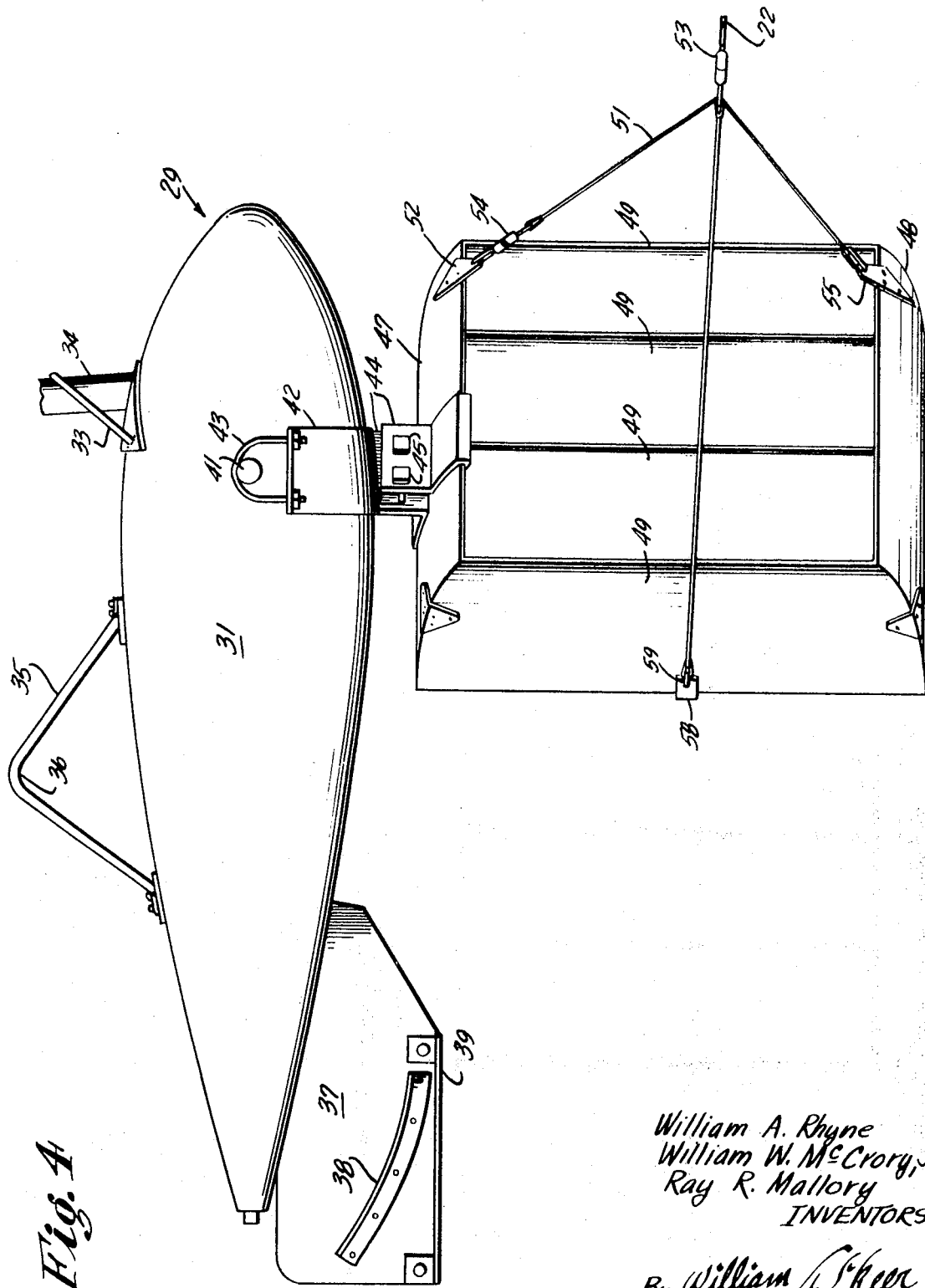

BUOYANT CABLE TOWING SYSTEM

STATEMENT OF GOVERNMENT INTEREST

The invention described herein may be manufactured and used by or for the Government of The United States of America for governmental purposes without the payment of any royalties thereon or therefor.

BACKGROUND OF THE INVENTION

This invention relates to the field of marine towing. More particularly, but not by the way of limitation, this invention pertains to the towing of electrical instrumentation gear on the surface of a body of relatively shallow water. In this regard, the invention will be described as it pertains to the towing of buoyant electrical cables, as they might be employed in geophysical prospecting or in the countermeasure sweeping of influence-type marine mines.

Prior art towing arrangements have relied upon separate hardware for diversion of the towed gear and depth regulation thereof. In instances where it is desirable to tow measuring instruments or other apparatus employing an open loop electrical conductor buoyed so as to float on the surface, prior art arrangements have proven unsatisfactory in many instances. Particularly difficult towing problems arise with the prior art arrangements when it is desired to tow these devices along predetermined paths in shallow waters, such as might be encountered in bay and river environments.

The difficulties are attributable to the nature of the cables themselves. In order to adequately handle the large electrical currents necessary to provide an effective bottom influence, the towed cable must be of a large cross section. A great deal of weight is associated with lengths of such large gauge conductor. To make the conductor buoyant, so that it will remain on the surface, a large number of buoyant floats are placed along the length thereof. Obviously, the resulting buoyant conductor so constructed is a bulky unit.

In addition to their undesirable bulk, the buoyant floats on the cable have an undesirable thermal insulative effect which adversely affects the electrical resistance of the buoyant conductors. As a result of the storage problems and the insulation problems, the buoyant floats placed on the conductors are kept to a minimal size just sufficient to assure a small positive buoyancy.

The diverter devices used to hold the conductors in an opened loop also tend to run toward the bottom. They must, therefore, be constrained against this diving action by a separate buoyant means. This separate buoyant means and attaching bridle require a separate towline.

The aforedescribed towing arrangements for streaming an open loop of electrical conductor (or any cable, rope, or the like) on the surface of the water require large turning radii for maneuvering the draft vehicle. In sinuous watercourses this limitation taken together with the relatively deep draft of prior art systems frequently preclude a continuous traverse of the area with the towed gear.

Additionally, the towing arrangements afforded by known apparatus require that the float and diverter components thereof be streamed and recovered individually, with an attendant inefficiency in manpower and time expenditures.

Prior towing arrangements have restricted the use of symmetrically diverted towed instrumentation or conductor cables. This lack of symmetry has detracted from the results obtained therefrom and, more practicably, required that a much greater length of time be expended to completely traverse an area with the towed gear. This is due to the navigational limitations imposed by the large turning circle of the prior art towing arrangements plus the additional time spent in streaming and recovering the gear.

SUMMARY OF THE INVENTION

The present invention provides an improved system for towing an opened loop of cable on the surface of a body of water. Although not limited in concept thereto, the system will be described as it pertains to the towing of an electrical cable. The system of the invention tows a pair of surface float-diverter devices which are positioned on opposite sides of the loop of cable to open it symmetrically aft of the tractor vehicle and hold it open as it is towed through the water.

The diverter-float units comprise a buoyant body portion with a diverter arrangement rigidly suspended below the body portion. The buoyant body portion has an empennage assembly which adds to the stability thereof as it is towed through the water. The apparatus used for attachment of the diverter to the buoyant body portion permits compact storage of the unit and facilitates the service thereof when required.

It is therefore an object of this invention to provide an improved towing apparatus.

Another object of this invention is to provide a system for towing a loop of buoyant cable on the surface of the water.

A further object of this invention is to provide an improved buoyant diverter assembly.

Another object of this invention is to provide a rigidly coupled float and diverter assembly.

A further object of this invention is to provide a buoyant diverter assembly to be used in shallow waters.

A still further object of this invention is the provision of a diverter assembly with improved tracking abilities.

A still further object of this invention is the provision of a float-diverter system with improved surface stability.

Another object of this invention is the provision of a float and diverter assembly for use with buoyant cable tows that is easily launched and recovered.

Other objects and many of the attendant advantages will be readily appreciated as the subject invention becomes better understood by reference to the following detailed description, when considered in conjunction with the accompanying drawings.

BRIEF DESCRIPTION OF THE DRAWINGS

FIG. 3 is a top plan view of the float and diverter unit of the invention;

FIG. 4 is a side elevation view of the float and diverter unit of the invention;

FIG. 5 is a section through the buoyant cable of the type used by the towing system of the invention;

FIG. 6 is an illustration of the device for applying towing tension to the towed gear, as used in the system of the invention.

BRIEF DESCRIPTION OF THE PREFERRED EMBODIMENT

Figure 1:
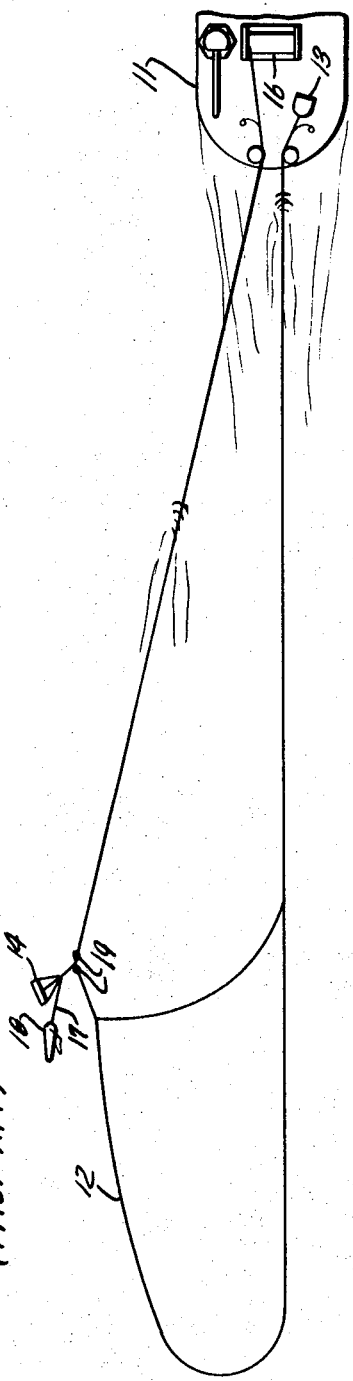
FIG. 1 is a plan view of the prior art system in use.

Referring to FIG. 1, the prior art arrangement for towing buoyant cables is shown. A surface vessel 11 tows a closed loop 12 of buoyant cable. The buoyant cable is stored on appropriate reels below decks of vessel 11 and is payed out from a suitably shaped cable hatch 13. Loop 12 is held open by the action of a diverter 14 towed submerged beneath the water at the end of tow cable 15 which is payed out from winch 16.

The depth to which diverter 14 is submerged is controlled by the length of a towing bridle 17 which extends between diverter 14 and surface float 18. Diverter 14 is attached by means of a shackle to ride between two towing cable stops 19 on tow cable 15. The remainder of tow cable 15, beyond stops 19, is slightly greater in length than tow bridle 17 and is attached to buoyant cable 12.

The difficulties imposed by this prior art towing have limited the applications to deep water and open areas where maneuvering room is abundant. The magnitude of the difficulty imposed by these limitations is obvious to those familiar with the development of the state of the art as outlined above.

Figure 2:
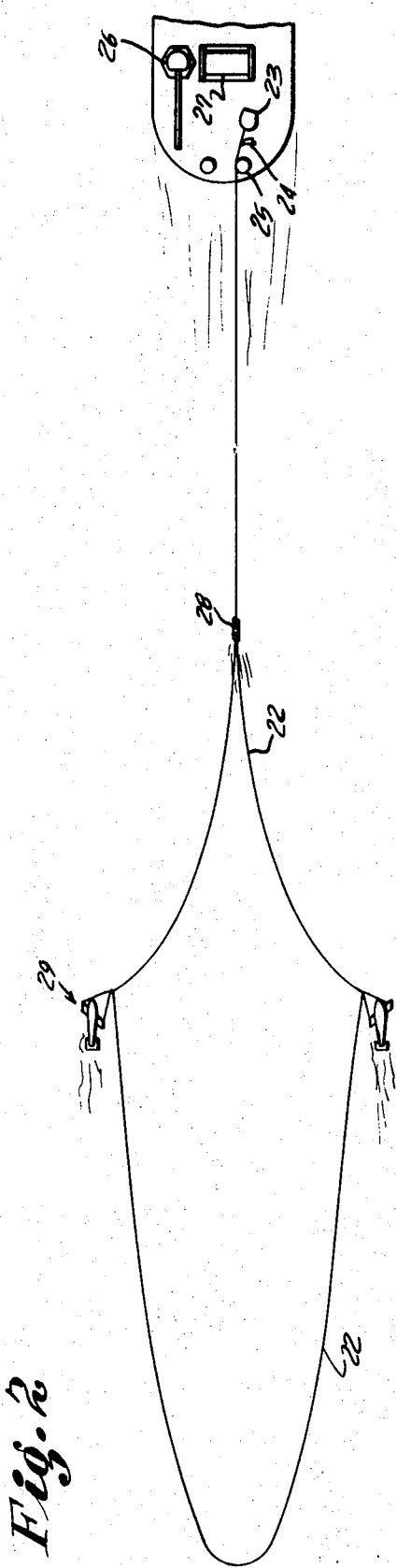
FIG. 2 is a plan view of the system according to the invention in use.

Referring to FIG. 2, there is shown the improved system according to the invention. A tractor vehicle, such as tow ship 21, is shown pulling a loop of buoyant cable 22 along a predetermined course. As in the case of the prior art, the portion of buoyant cable 22 not being streamed is stored in the tween deck space of tow ship 21 and emerges through a suitable hatch 23. Towing gear 24, to be described in greater detail herein, secures cable 22 to the deck of ship 21. Cable 22 passes through two stern bits 25, or roller chocks, rearward to form a loop to the aft of tow ship 21. Crane 26, used in streaming and recovery of the towed gear, completes the shipboard equipment portion of the system of the invention. Stern-mounted winch 27, normally used in such towing operations, is not used in the improved system of the invention.

The tractor vehicle shown is a surface tow vessel but other vehicle types may serve the purpose as well, such as aircraft, submarine vehicles, and air cushion vehicles. Such substitutions are obvious to proficient marine engineers and are, of course, within the intended scope of the invention.

At a point some predetermined distance astern of tow ship 21, a cable junction 28 is provided to route cable 22 into a closed loop. In this regard, it is to be noted that forward of junction 28 cable 22 is of a doubled construction with two conductors encased in a single series of buoyant floats. An electrical circuit path is thereby provided with the current flowing down one of the doubled cable lengths, around the loop, and back the other of the doubled cables. As may be readily understood, since the current is of the same magnitude but of opposite direction, the electrical field produced by each section of the doubled portion forward of junction 28 cancels the field of the other section. This results in localizing the magnetic influence produced by cable 22 to an area a predetermined distance astern tow ship 21. The operational advantages of such an arrangement are well understood in geophysical measurement fields and minesweeping activities and are so apparent as not to require further comment.

At predetermined distances aft junction 28, on each side of the loop in cable 22, float-diverters 29 are attached to cable 22. The port and starboard float-diverters 29 are identical with the exception of the direction that the diverter portion is mounted with relation to the float portion. As will be more completely explained herein, float-diverters 29 hold cable 22 in an open loop without closing during turning maneuvers of unusually short radii.

Referring to FIGS. 3 and 4, a more complete illustration of float-diverters 29 is shown. The figures comprise two mutually orthogonal views of the same components and will, therefore, be described together. Float-diverter 29 comprises a float unit 31 and a diverter unit 32.

Float unit 31 is of a generally teardrop shape to minimize hydrodynamic drag. At the bow end and on the topside of float unit 31, a mount 33 supports an upright mast 34. At the topmast portion of mast 34, a tracking aid, such as a pennant or retroreflector, not shown, may be mounted to assist in tracking float-diverter 29.

Abaft mast 34 on the topside of float unit 31, lifting bale 35 is mounted. Bale 35 extends upwardly along the longitudinal axis of body unit 31 to make a large area loop with the uppermost portion formed into a small radius bend 36. The purpose of bale 35 is, as the name implies, to facilitate the streaming and recovery of the float-diverter assembly 29.

At the aftermost portion of float unit 31, a stabilizer assembly extends downwardly into the water therebeneath. A vertical stabilizer 37 serves both as a keel to minimize the tendency to roll, and as a rudder which is effective to counter yaw. The stabilizer assembly is completed by a generally horizontal curved stabilizer 38 and a planar horizontal stabilizer 39. Although other methods of attachment may be used, the curved stabilizer 38 is riveted to vertical stabilizer 37 and threaded fasteners are used for the attachment of horizontal stabilizer 39 thereto.

A mounting stud 41 extends outwardly from each side of float unit 31 at points longitudinally disposed between mount 33 and the forward end of lifting bale 35 and generally in the median plane of float unit 31. Float bands 42 are secured to studs 41 by fitted U-bolts 43. Bands 42 conform to the contours of float unit 31 and terminate therebeneath in downwardly extending flanges 44. Flanges 44 are interconnected by threaded fasteners 45 which together with U-bolts 43 assure a close fit between float bands 42 and float unit 31.

As shown, flanges 44 are diagonally disposed with relation to the longitudinal axis of float unit 31. The unit illustrated in FIGS. 3 and 4 is a port unit. Starboard units differ only in the relative direction of the diagonal disposition of flanges 44.

The lower end of flanges 44 are bent outwardly and the ends formed into clamps 46 to securely grip upper surface 47 of diverter unit 32. A lower surface 48 is similar to the upper surface 47 and cooperates therewith to support a plurality of vanes 49 extending vertically therebetween. Vanes 49 are contoured in accordance to well-understood principles of hydrodynamic design to provide the diverting force which displaces float-diverter 29 from the course of tow ship 21.

The rigid coupling of diverter unit 32 to the float unit constitutes an unobvious development difference between float-diverter 29 of the invention and the prior art arrangements as illustrated at FIG. 1. Previous attempts at making the diverter tackle of the prior art of a more shallow draft have met with little or no success. Shortening the float-to-diverter towing bridle 17 (FIG. 1) has produced a marked instability in the units causing repeated oscillatory surfacing, e.g., porpoising, of the component parts. This instability causes damage to the components themselves and ofttimes damage to the towing craft. In addition, the instability gives poor diversion and control of the buoyant cable loop. Previous experience had indicated that a practicable minimum bridle length was approximately 3 meters.

A length of cable forming top pendant 51 extends between towing eye 52, located at the upper forward inboard corner of diverter unit 32, and swivel 53. Turn buckle 54 in top pendant 51 adjusts the length thereof when desired. A lower turning eye 55, located at the lower forward inboard corner of diverter unit, provides a tie point for bottom pendant 56 which, like top pendant 51, extends to swivel 53. A back pendant 57 extends from swivel 53 to a back bar 58 where it is attached by a shackle 59. If desired, turnbuckles similar to turnbuckle 54 may be placed in bottom pendant 56 or back pendant 57 either instead of turnbuckle 54 or in addition thereto. In most instances only a single turnbuckle is required. Pendants 51, 56 and 57 together with swivel 53 comprise a towing bridle means by which float-diverter 29 is attached to a buoyant cable 22.

Referring to FIG. 5, a sectional view taken along line 5—5 of FIG. 2, it is seen that buoyant cable 22 comprises an inner conductor 61 covered by a layer of insulation 62. Insulation 62 may be of any suitable type. Surrounding the insulated layer 62 so as to be coaxial therewith is a buoyant float 63. The individual buoyant floats 63 are of small longitudinal dimensions, generally on the order of 15 to 20 centimeters, to permit flexible handling of buoyant cable 22. Buoyant float 63 may be of any suitable material such as wood or lightweight plastic. In some applications an additional high tensile strength strand, not shown, is included as a central component of cable 22 to take the tension loadings imposed by long lengths. Ofttimes, this tension-transmitting function is performed by a woven layer overlying and surrounding insulation layer 62. Such alternative constructions are conventional in the art and may be incorporated in the system of the invention as a matter of choice to one versed in the marine engineering arts.

FIG. 6 illustrates how towing connection is made to buoyant cable 22 by towing gear 24. A plurality of buoyant floats 63 are removed from cable 22 and the exposed insulation layer 62 is wrapped with antichafe layer 64. Antichafe layer 64 may be made of any suitable wear resistant material which is flexible and compatible with the insulated inner conductor portion of cable 22. A wrapping of heavy canvas material has proven satisfactory for this purpose.

A woven metal sleeve 65, termed "towing stocking" in the art, is placed over the antichafe layer 64. Sleeve 65 has an eye ring 66 at one end thereof which extends away from cable 22. Ring 66 is attached to the deck of tow ship 21 by conventional marine hardware for towing of cable 22 thereby. As sleeve 65 is tensioned longitudinally it contracts radially, in a manner familiar to those acquainted with the novelty device commonly called a "Chinese handcuff," to grip the antichafe layer 64. This gripping connection is sufficient to secure cable 22 for towing purposes.

Similar towing connections are made to float-diverters 29 by shackeling eye 66 to swivel 53 either directly or with a short pendant.

The foregoing description of Applicant's structural system, while sufficient for a person skilled in the marine engineering arts to make and use the device, is better understood where considered in conjunction with the following preferred mode of operation.

MODE OF OPERATION

When it is desired to stream the towed gear, the closed end of the loop of cable 22 is brought up through hatch 23 and run overboard between bits 25. When a predetermined length of cable 22 is payed out, the attachment points for float-diverters 29 emerges through hatch 23. A float-diverter 29 is lifted aloft by crane 26 engaging lifting bale 35 and held at a convenient working position. Swivel 53 is secured to cable 22 and the float-diverter 29, with cable 22 attached is placed overboard into the water. The above steps are repeated to attach the other float-diverter 29 and it is, in turn, placed overboard.

The paying out of cable 22 is continued until junction 28 is the desired predetermined distance astern tow ship 21. Cable 22 is then secured by making towing gear 24 fast to the appropriate fixtures on towing ship 21. Electrical connections are then made to cable 22 and the cable energized as in the prior art configurations.

The shallow draft of the float-diverters 29 and the high compliance of tow ship tracking made possible by the elimination of the extra diverter tow cable 15 permit the use of the gear of the invention in shallow sinuous watercourses where magnetic gear of this type have not been used in the past.

The foregoing description taken together with the appended claims constitute a disclosure such as to enable a person who is skilled in the marine engineering arts and having the benefit of the teaching contained therein to make and use the invention. Further, the structure herein described meets the objects of invention, and generally, constitutes a meritorious advance in the art unobvious to such a skilled person not having the benefit of the teachings contained herein.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. An improved system for towing a buoyant cable along a predetermined watercourse comprising in combination:
   draft vehicle means for navigation of said predetermined watercourse;
   buoyant cable means effectively attached to said draft vehicle means for movement thereby and for establishing a conductive loop current path on the surface of said water;
   surface float means for buoying upwardly objects attached thereto;
   stabilization means attached to said surface float means for minimizing undesirable pitch, roll, and yaw movements thereof;
   diversion means for generating a lateral force in response to forward movement thereof;
   rigid mounting means connected between said surface float means and said diversion means for connecting said diversion means beneath and in fixed relation to said surface float means for facilitating the deployment of said towing system in relatively confined watercourses; and
   towing bridle means connected between said diversion means and said buoyant cable means for the towing thereof.

2. An improved towing system as recited in claim 1 in which said buoyant cable means further comprises in combination:
   an innermost metallic conductor means extending throughout the length of said buoyant cable means for transmission of electrical energy therethrough;
   a layer of insulation material surrounding said metallic conductor means and coextensive therewith for electrically insulating said conductor means from electrical contact with other objects; and
   buoyant means substantially surrounding said conductor means and said coextensive insulation material for the support thereof on the surface of a body of water while allowing water to contact said insulation for the cooling thereof.

3. An improved towing system as set forth in claim 2 in which said buoyant means comprises a plurality of discrete buoyant floats placed along the length of and surrounding the aforesaid insulation-surrounded conductor means for flexibly encasement thereof in a buoyant layer.

4. An improved towing system according to claim 1 in which said surface float means further comprises:
   outwardly protruding mounting stud means located on the sides of said surface float means for attachment of said mounting means thereto.

5. An improved towing system according to claim 1 further comprising:
   outwardly protruding mounting stud means located on the sides of said surface float means for attachment of said mounting means thereto;
   U-bolt means positioned over said mounting stud means for engagement therewith and extending downwardly therefrom to pass through and engage said mounting means for attachment thereof to said surface float means; and
   flange means extending downwardly from said mounting means and engaging the aforesaid diversion means for rigid support thereof.

6. An improved towing system as recited in claim 1 wherein said stabilization means further comprises:
   vertical stabilizer means connected to said surface float means at the rearward portion thereof and extending downwardly therefrom into said watercourse for reduction of yawing and rolling tendencies of said surface float means;
   curved stabilizer means connected to said vertical stabilizer means and extending laterally outwardly therefrom and having a generally cylindrically curved surface with straight forward and aft edges and mounted with its forward edge lower than its aft edge for reducing the rolling and pitching motions of said surface float means; and
   planar horizontal stabilizer means connected to the lower edge of said vertical stabilizer means so as to extend laterally outwardly therefrom cooperating with said curved stabilizer means for reducing the rolling and pitching motions of said surface float means.

7. An improved system for towing a buoyant cable along a predetermined watercourse comprising in combination:
   draft vehicle means for navigation of said predetermined watercourse;
   buoyant cable means effectively attached to said draft vehicle means for movement thereby and for establishing a conductive loop current path on the surface of said water;
   float unit means having a streamlined shape tapering from a generally spherically shaped forward portion to a pointed aft portion for buoyant support of streaming equipment attached thereto;

vertical stabilizer means connected to said float unit means at the aft portion thereof and extending downwardly therefrom into said watercourse for reduction of yawing and rolling motions of said float unit;

curved stabilizer means connected to said vertical stabilizer means and extending laterally outwardly therefrom and having a generally cylindrical curved surface between straight forward and aft edges and mounted with its forward edge lower than its aft edge for reducing the rolling and pitching motions of said float unit means;

planar horizontal stabilizer means connected to said vertical stabilizer means and extending laterally outwardly therefrom for cooperating with said curved stabilizer means for reducing the rolling and pitching motions of said float unit means;

outwardly extending stud means located on the side of said float unit means for providing mounting attachment means thereon;

U-bolt means positioned over said stud means and extending downwardly therefrom for providing connection means therefor;

float band means connected to said U-bolt means in such a manner as to lie against said float unit means;

flange means connected to said float band means and extending downwardly therefrom for providing gripping support of objects placed in engagement therewith;

diverter means, having vertical deflection vanes, gripped by said flange means for effective support by said float unit means, so as to produce a lateral diverting force in response to forward movement of said float unit means; and towing bridle means attached to said diverter means and to said buoyant cable means for transmission of towing force therebetween.